US011030150B1

(12) United States Patent
Sokolov et al.

(10) Patent No.: US 11,030,150 B1
(45) Date of Patent: Jun. 8, 2021

(54) SYSTEMS AND METHODS FOR CLASSIFYING ELECTRONIC FILES

(71) Applicant: Symantec Corporation, Mountain View, CA (US)

(72) Inventors: Ilya Sokolov, Boston, MA (US); Lei Gu, Bedford, MA (US); Keith Newstadt, Newton, MA (US)

(73) Assignee: NortonLifeLock Inc., Tempe, AZ (US)

( * ) Notice: Subject to any disclaimer, the term of this patent is extended or adjusted under 35 U.S.C. 154(b) by 594 days.

(21) Appl. No.: 15/583,410

(22) Filed: May 1, 2017

(51) Int. Cl.
*G06F 16/13* (2019.01)
*H04L 29/08* (2006.01)
*G06F 16/16* (2019.01)
*G06F 16/28* (2019.01)

(52) U.S. Cl.
CPC ............ *G06F 16/13* (2019.01); *G06F 16/168* (2019.01); *G06F 16/285* (2019.01); *H04L 67/22* (2013.01)

(58) Field of Classification Search
CPC ......... G06F 17/30707; G06F 17/30595; G06F 17/3061; G06F 16/13; G06F 16/285; G06F 16/168; H04L 67/22
USPC ........................................................ 707/740
See application file for complete search history.

(56) References Cited

U.S. PATENT DOCUMENTS

| | | | | |
|---|---|---|---|---|
| 7,783,622 B1* | 8/2010 | Vandermolen | ........ | G06F 16/951 707/708 |
| 8,719,278 B2* | 5/2014 | Karmarkar | ............ | G06F 16/436 707/748 |
| 8,924,352 B1* | 12/2014 | Andruss | ............... | G06F 11/1461 707/640 |
| 9,747,013 B2* | 8/2017 | Kluesing | ............. | G06F 12/0862 |
| 2011/0307408 A1* | 12/2011 | Gates | ..................... | G06Q 50/18 705/342 |
| 2016/0063549 A1* | 3/2016 | Fuchs | ................ | G06Q 30/0255 705/14.53 |
| 2016/0225224 A1* | 8/2016 | Nguyen | ............. | G07F 17/3225 |
| 2017/0103472 A1* | 4/2017 | Shah | .................. | G06K 9/00597 |
| 2018/0284958 A1* | 10/2018 | Alphin, III | ........ | G06F 16/24575 |

OTHER PUBLICATIONS

PSFK; http://www.psfk.com/2012/10/watch-relieves-stress.html; last accessed Apr. 25, 2017.

(Continued)

*Primary Examiner* — Hosain T Alam
*Assistant Examiner* — Robert F May
(74) *Attorney, Agent, or Firm* — FisherBroyles, LLP

(57) ABSTRACT

The disclosed computer-implemented method for classifying electronic files may include (i) identifying an electronic file that is being evaluated for importance by a file-categorization system, (ii) collecting, via at least one user-state monitoring device, information about a physical state of at least one user while the user is interacting with the electronic file, (iii) determining, based on the information about the physical state of the user while the user was interacting with the electronic file, whether the user considers the electronic file to be important, and (iv) classifying, by the file-categorization system and based at least in part on determining whether the user considers the electronic file to be important, the electronic file as an important file. Various other methods, systems, and computer-readable media are also disclosed.

20 Claims, 7 Drawing Sheets

(56) References Cited

OTHER PUBLICATIONS

Brady Dale; This wearable device reads your brain waves. Is there a market for it?; http://fortune.com/2014/02/10/this-wearable-device-reads-your-brain-waves-is-there-amarket-for-it/; Feb. 10, 2014.

MacRumors; Apple Researching Automatic Mood Assessment for Targeted Add Delivery; http://www.macrumors.com/2014/01/23/moodbased-ad-delivery/; last accessed May 1, 2017.

Winkler et al.; Apple Buys Artificial-Intelligence Startup Emotient; http://www.wsj.com/articles/apple-buys-artificial-intelligence-startup-emotient-1452188715; Jan. 7, 2016.

Razuri et al.; Automatic Emotion Recognition Through Facial Expression Analysis in Merged Images Based on an Artificial Neural Networks; http://ieeexplore.ieee.org/xpls/abs_all.jsp?arnumber=6714652&tag=1; Nov. 24, 2013.

\* cited by examiner

SYSTEMS AND METHODS FOR CLASSIFYING ELECTRONIC FILES

BACKGROUND

Many organizations utilize computing systems that handle large numbers of electronic files. Such organizations may also use a variety of systems to manage and/or secure these files. For example, an organization may employ a data-loss prevention (DLP) solution to prevent sensitive information from leaving secured company networks. Additionally or alternatively, an organization may maintain backup copies of various files. These systems may include components that treat some files differently than others based on the importance of the file. For example, a DLP solution may treat the transfer of valuable intellectual property documents with more scrutiny than a public conference announcement e-mail. Similarly, a backup solution may prioritize backing up current versions of a payroll database over backing up current versions of an individual employee's personal files.

Unfortunately, existing file-management solutions generally rely on users manually designating files as important. Such manual designation may be subject to human error, and may be unsuitable for large enterprises as different individuals may apply different criteria for determining what constitutes an important file. Furthermore, systems that rely on keyword detection and other traditional approaches may lack the flexibility to identify important files that don't contain pre-established keywords. Systems that rely on performing a similarity analysis between a document and known important documents may fail to flag files that don't match preexisting formats. The instant disclosure, therefore, identifies and addresses a need for systems and methods for classifying electronic files.

SUMMARY

As will be described in greater detail below, the instant disclosure describes various systems and methods for classifying electronic files. For example, a computer-implemented method for may include (i) identifying an electronic file that is being evaluated for importance by a file-categorization system, (ii) collecting, via at least one user-state monitoring device, information about a physical state of at least one user while the user is interacting with the electronic file, (iii) determining, based on the information about the physical state of the user while the user was interacting with the electronic file, whether the user considers the electronic file to be important, and (iv) classifying, by the file-categorization system and based at least in part on determining whether the user considers the electronic file to be important, the electronic file as an important file.

The computer-implemented method may include performing various calculations as part of determining whether the user considers the electronic file to be important. For example, determining whether the user considers the electronic file to be important may include calculating, based on the information about the physical state of the user, an attention score that represents a numerical approximation of whether the user considers the electronic file to be important. The attention score may include and/or be represented by a percentage probability that the user considers the electronic file to be important.

Furthermore, the attention score may be based on a variety of factors. In one embodiment, the attention score may be based on the frequency with which the user views the electronic file and/or the rate at which the user scrolls through the electronic file.

In some examples, the computer-implemented method may further include calculating an attention score for each user in a group of users that interact with the electronic file. In these examples, classifying the electronic file as the important file may include classifying the electronic file based on an aggregate attention score that represents an approximation of whether the group of users considers the electronic file to be important.

The physical state of the user may include a variety of information. For example, the physical state of the user may include the user's (i) heart rate, (ii) respiration rate, (iii) brainwave activity, and/or (iv) facial microexpressions. Optionally, collecting information about the physical state of the user may include tracking the direction of the user's field of vision. In embodiments that include tracking the user's field of vision, the computer-implemented method may further include identifying, based on analyzing the direction of the user's field of vision, an important section of the electronic file. Collecting the information about the physical state of the user may include collecting information from a variety of sources, such as a wearable device worn by the user.

In some embodiments, classifying the electronic file as the important file may include classifying the electronic file based on a role within an organization that is associated with the user. For example, classifying the electronic file based on the role within the organization may include classifying the electronic file as important to (i) the user, (ii) an organization, and/or (iii) a department within the organization.

In one embodiment, the computer-implemented method may further include (i) determining that the electronic file is part of an enterprise workflow and (ii) identifying a group of users involved in the enterprise workflow. In such an embodiment, classifying the electronic file may include classifying the electronic file as the important file based at least in part on determining whether each user in the group of users considers the electronic file to be important.

In some examples, determining whether the user considers the electronic file to be important may include analyzing the state of the user's electronic workspace while the user was interacting with the electronic file.

In various embodiments, the computer-implemented method may interact with other programs, applications, and/or systems. For example, the computer-implemented method may further include notifying at least one software security system that the electronic file is the important file, such as (i) a data-loss prevention system, (ii) a file backup system, and/or (iii) a file-integrity management system.

In one embodiment, a system for implementing the above-described method may include (i) an identification module, stored in memory, that identifies an electronic file that is being evaluated for importance by a file-categorization system, (ii) a collection module, stored in memory, that collects, via at least one user-state monitoring device, information about a physical state of at least one user while the user is interacting with the electronic file, (iii) a determination module, stored in memory, that determines, based on the information about the physical state of the user while the user was interacting with the electronic file, whether the user considers the electronic file to be important, (iv) a classification module, stored in memory, that classifies, by the file-categorization system and based at least in part on determining whether the user considers the electronic file to be important, the electronic file as an important file, and (v)

at least one physical processor configured to execute the identification module, the collection module, the determination module, and the classification module.

In some examples, the above-described method may be encoded as computer-readable instructions on a non-transitory computer-readable medium. For example, a computer-readable medium may include one or more computer-executable instructions that, when executed by at least one processor of a computing device, cause the computing device to (i) identify an electronic file that is being evaluated for importance by a file-categorization system, (ii) collect, via at least one user-state monitoring device, information about a physical state of at least one user while the user is interacting with the electronic file, (iii) determine, based on the information about the physical state of the user while the user was interacting with the electronic file, whether the user considers the electronic file to be important, and (iv) classify, by the file-categorization system and based at least in part on determining whether the user considers the electronic file to be important, the electronic file as an important file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
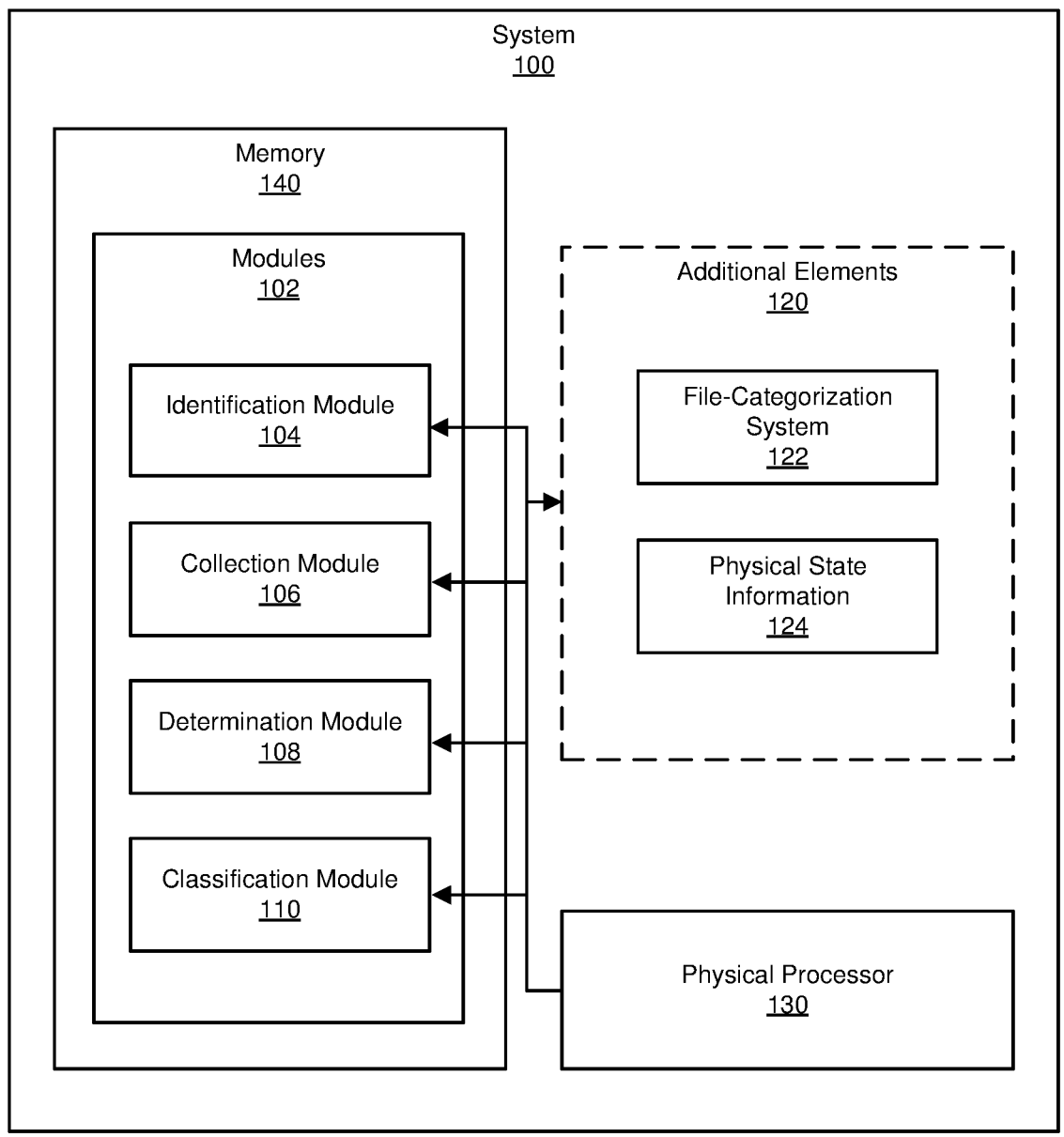
FIG. 1 is a block diagram of an example system for classifying electronic files.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for classifying electronic files. As will be described in greater detail below, the described systems and methods may enable the classification of files based on whether users that interact with those files consider them to be important. By classifying files based on users' emotional/mental states and/or how they interact with various files, the systems and methods described herein may enable file-classification systems to accurately classify files as important regardless of the type and/or contents of the file.

Additionally, the systems and methods described herein may improve the functioning of a computing system by enabling the computing system to accurately and automatically classify files as important or not. These same systems and methods may also improve the fields of computer security and/or data management by enabling software security systems and/or data-management systems to distribute resources so as to grant important files the scrutiny and protection that they deserve, while simultaneously conserving system resources by not expending computing resources on files of lesser importance.

Figure 2:
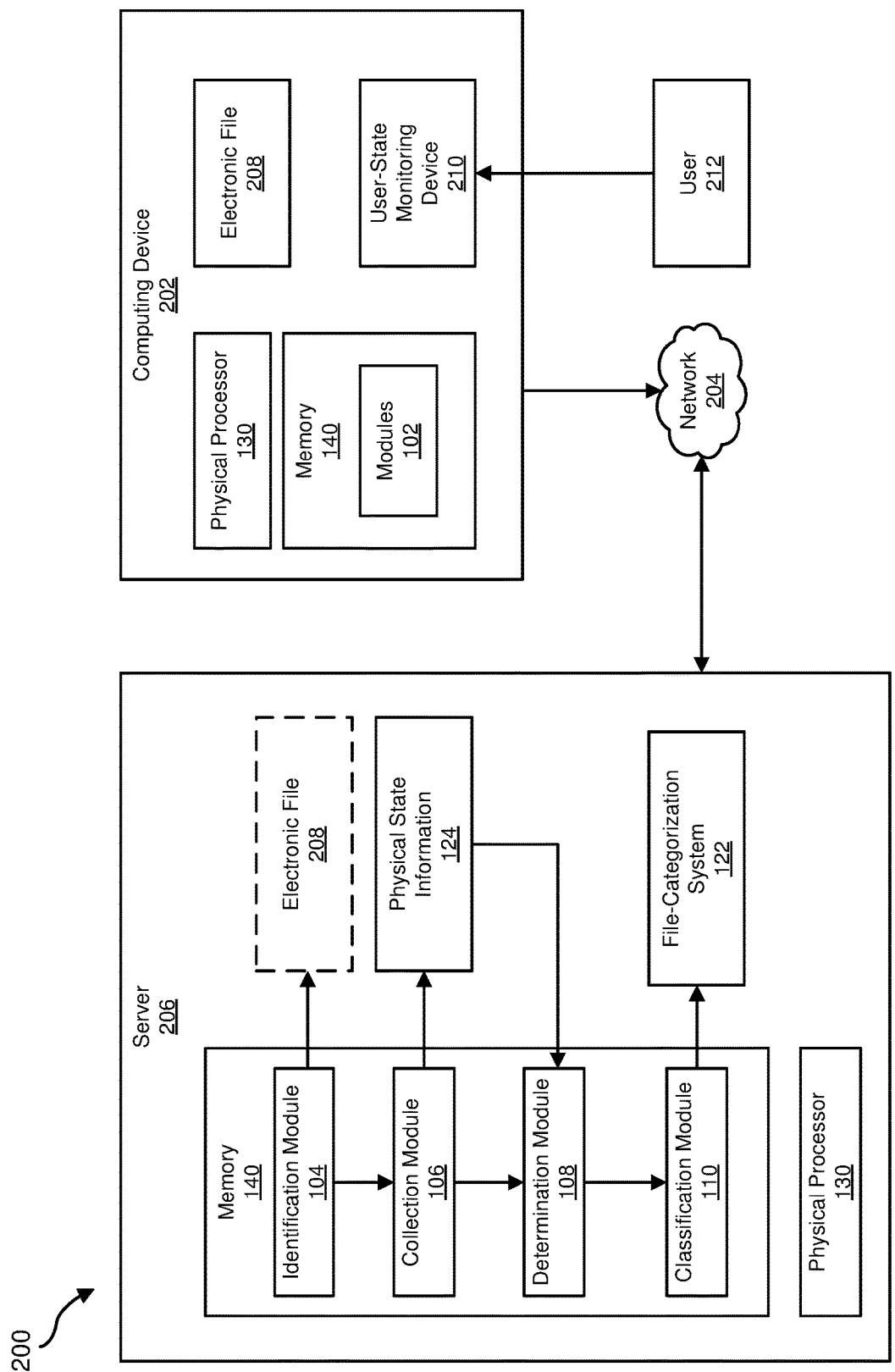
FIG. 2 is a block diagram of an additional example system for classifying electronic files.

The following will provide, with reference to FIGS. 1-2, detailed descriptions of example systems for classifying electronic files. Detailed descriptions of corresponding computer-implemented methods will also be provided in connection with FIG. 3. Detailed descriptions of example computing systems for determining whether a user considers a file to be important will be provided in connection with FIG. 4, and further descriptions of example computing systems for classifying electronic files will be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of example system 100 for classifying electronic files. As illustrated in this figure, example system 100 may include one or more modules 102 for performing one or more tasks. For example, and as will be explained in greater detail below, example system 100 may include an identification module 104 that identifies an electronic file that is being evaluated for importance by a file-categorization system 122. Example system 100 may additionally include a collection module 106 that collects, via at least one user-state monitoring device, physical state information 124 about at least one user while the user is interacting with the electronic file. Example system 100 may also include a determination module 108 that determines, based on physical state information 124, whether the user considers the electronic file to be important. Example system 100 may further include a classification module 110 that classifies, by file-categorization system 122 and based at least in part on determining whether the user considers the electronic file to be important, the electronic file as an important file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate classifying electronic files. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as file-categorization system 122 and physical state information 124. Although presented briefly here, the various components of additional elements 120 will also be described further in connection with FIG. 3.

File-categorization system 122 generally represents any type or form of software system that sorts files by importance. As will be described in greater detail below, file-categorization system 122 may categorize files in a variety of ways, including but not limited to sorting files into broad categories, assigning importance scores, ranking files within a group of files, designating files as important to a specific group of users, etc. File-categorization system 122 may create and/or maintain a database describing which files within a file system are important. Additionally or alternatively, file-categorization system 122 may modify metadata associated with a file as part of categorizing the file. File-categorization system 122 may base its categorization of a file on physical state information 124.

Physical state information 124 generally represents information about the physical state of a user that was collected while the user was interacting with a file that is under evaluation by file-categorization system 122. For example, physical state information 124 may include a user's heart rate, respiration rate, facial microexpressions, and/or skin conductivity rating. These aspects of the physical state of a user may be used to determine the user's emotional state, level of attentiveness, etc., that may then be used to determine whether the user considers a file to be important.

Physical state information 124 may be based on information derived from a variety of sources, including but not limited to wearable devices such as fitness monitors and smart glasses, stationary peripheral devices such as cameras (e.g., webcams) and microphones, and/or any other suitable source of information about the physical state of a user. Additionally or alternatively, physical state information 124 may include brainwave activity of a user and/or information describing the direction of the user's field of vision (sometimes referred to as "gaze tracking" or similar). As will be described in greater detail below, the systems and methods described herein may analyze this information to determine whether a user considers a file to be important.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to monitor the physical state of a user and categorize files based on how the user behaved while interacting with those files. For example, and as will be described in greater detail below, identification module 104 may identify an electronic file 208 that is being evaluated for importance by file-categorization system 122. Collection module 106 may collect, via at least one user-state monitoring device 210, physical state information 124 of at least one user 212 while user 212 is interacting with electronic file 208. Determination module 108 may determine, based on the information about physical state information 124, whether user 212 considers electronic file 208 to be important. Classification module 110 may classify, by file-categorization system 122 and based at least in part on determining whether user 212 considers electronic file 208 to be important, electronic file 208 as an important file.

Computing device 202 generally represents any type or form of computing device capable of reading computer-executable instructions. For example, computing device 202 may represent a user's personal computer, enterprise workstation, mobile device, tablet computing device, or any other computing device used to access an organization's files. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of receiving and analyzing information about users and then categorizing files based on that user information. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

User-state monitoring device 210 generally represents any type or form of device for collecting physical state information 124 about user 212. In general, user-state monitoring device 210 may directly observe or otherwise monitor user 212. Examples of user-state monitoring device 210 include, without limitation, cameras, microphones, biometric sensors, headsets, fitness monitors (e.g., a FITBIT personal monitor), smart watches, smart glasses (e.g., GOOGLE GLASS), smart watches, smart phones, so-called Internet-of-Things (IoT) devices, purpose-built devices, combinations of one or more of the same, or any other suitable device that observes or monitors user 212.

Electronic file 208 generally represents any type or form of electronic information that is stored in a discrete unit commonly referred to as a "file." Users may view and/or interact with electronic file 208 in a variety of ways, depending on the nature of electronic file 208. For example, users may interact with a file by opening, reading, closing, and/or modifying the file. As a more specific example, a user may view various document files, such as spreadsheets, text files, MICROSOFT WORD or MICROSOFT EXCEL files, etc., through an application or program. A user may interact with an executable file by running the executable file and acting on elements of a user interface presented by the executable file. Users may also move, copy, transfer, or modify metadata of a file as part of interacting with the file.

Figure 3:
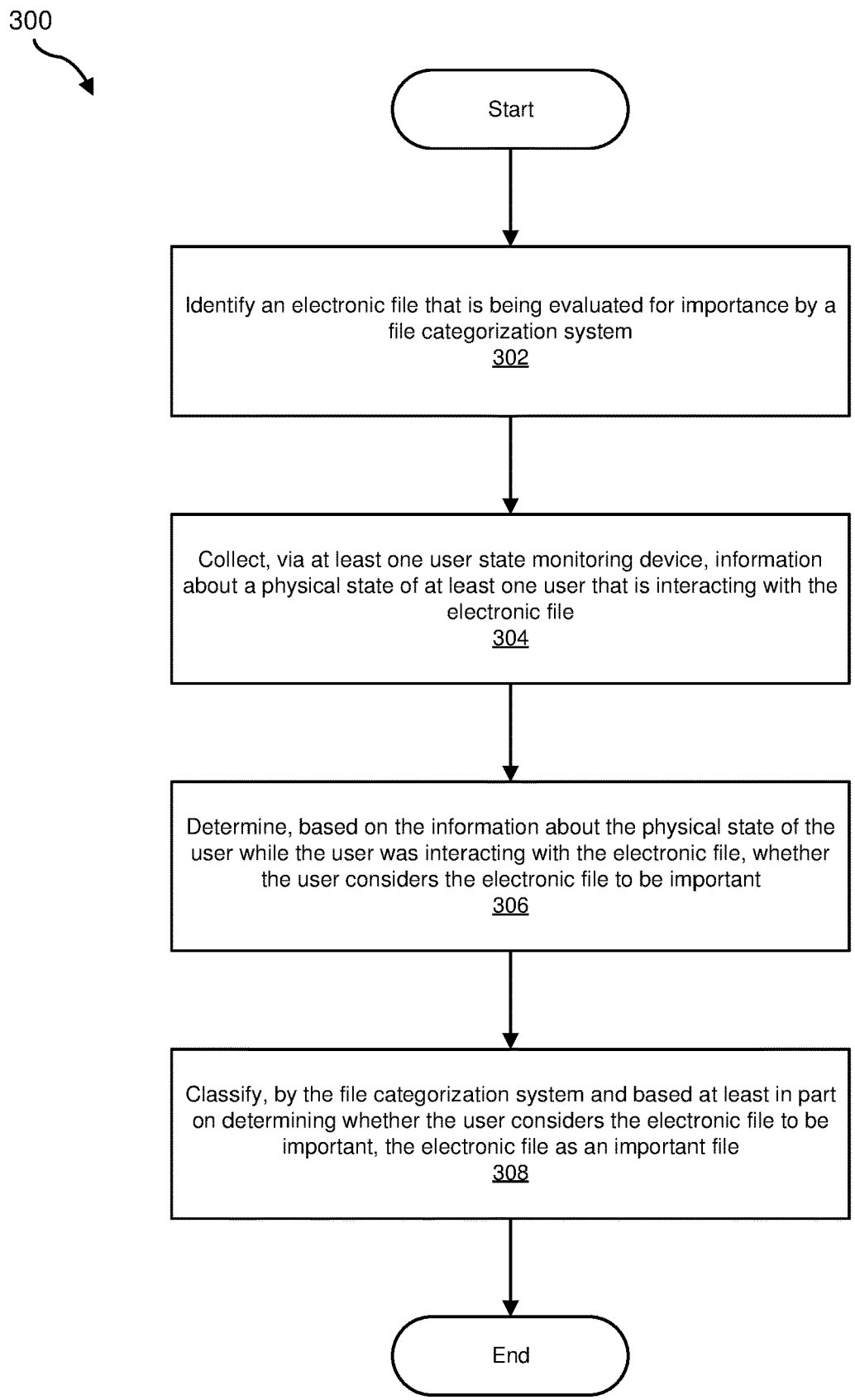
FIG. 3 is a flow diagram of an example method for classifying electronic files.

FIG. 3 is a flow diagram of an example computer-implemented method 300 for classifying electronic files. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify an electronic file that is being evaluated for importance by a file-categorization system. For example, identification module 104 may, as part of server 206 in FIG. 2, identify electronic file 208 that is being evaluated for importance by file-categorization system 122.

Identification module 104 may identify electronic file 208 in a variety of ways. In some embodiments, identification module 104 may determine that a user is interacting with a file and identify that file as electronic file 208. For example, identification module 104 may identify a file that has been opened on a user's workstation (e.g., computing device 202) as electronic file 208. As an additional example, identification module 104 may identify a file that is being viewed through an active window on a user's workstation as electronic file 208. As a further example, identification module 104 may track mouse clicks on the user's computer and identify documents, applications, and/or other files that receive the mouse click events. Identification module 104 may identify files that receive mouse click events as electronic file 208.

In some embodiments, identification module 104 may determine that the file in question is being evaluated for importance based on metadata associated with that file. For example, file-categorization system 122 may flag uncategorized files for review by modifying metadata associated with those files. Additionally or alternatively, file-categorization system 122 may maintain a list and/or database of files that have been categorized. In some embodiments, such a list or database may indicate the importance of each file represented in the database, as will be described in greater detail below. In these examples, identification module 104 may examine metadata and/or search a database for information describing whether a particular file is being evaluated for importance prior to identifying the file as electronic file 208.

In embodiments such as applications in enterprise environments where the systems and methods described herein aggregate data across many different users to determine the importance of a file, file-categorization system 122 may ensure that various copies of a given file are treated as instances of the same file. For example, file-categorization system 122 may flag a particular file in a database or through metadata associated with that file. Various individuals and/or systems may copy, transfer, or otherwise generate additional instances of the particular file. Identification module 104 may then determine when a user interacts with any instance of the file and prompt other elements of modules 102 to collect information about those users' physical states, as will be described in greater detail below. These other elements of modules 102 may then treat all of this aggregated user-state information as pertaining to the particular file and propagate categorizations associated with that file to all other copies and/or instances of the file. As a specific example, an executive of an organization may distribute copies of an internal memo to employees. File-categorization system 122 may have determined that this internal memo should be evaluated for importance. Accordingly, identification module 104 may identify all copies and/or instances of the memo as electronic file 208, i.e., related to the same originally distributed memo, and cause other elements of modules 102 to do likewise.

In some embodiments, identification module 104 may retrieve, receive, and/or otherwise identify classifications that were previously assigned to a file and refrain from identifying certain files as electronic file 208. For example, file-classification system 122 and/or other external systems may classify various electronic files according to type, expected usage, priority, and/or a variety of other factors. Identification module 104 may account for these factors when determining whether to identify a particular file as electronic file 208 and cause other elements of modules 102 to evaluate the file for importance. Identification module 104 may use any suitable heuristic, database, and/or other form of analysis when determining whether to identify a particular file as electronic file 208 in this manner. As an example, identification module 104 may maintain a database of file categories that should not be evaluated for importance in order to conserve system resources. Such a database may include categorizations such as leisure materials, publicly available information, etc. As a specific example, a user may maintain a collection of digital comic books. An external classification system may categorize these digital comic books as leisure materials, and identification module 104 may accordingly refrain from identifying the digital comic books as electronic file 208.

At step 304 in FIG. 3, one or more of the systems described herein may collect, via at least one user-state monitoring device, information about a physical state of at least one user while the user is interacting with the electronic file. For example, collection module 106 may, as part of server 206 in FIG. 2, collect, via at least one user-state monitoring device 210, physical state information 124 of at least one user 212 while user 212 is interacting with electronic file 208.

Collection module 106 may collect physical state information 124 from a variety of sources. For example, collection module 106 may record physical state information 124 through peripheral devices (illustrated as user-state monitoring device 210) connected to computing device 202. Examples of such peripheral devices include, without limitation, cameras, microphones, biometric sensors, headsets, etc. Similarly, collection module 106 may collect physical state information 124 from wearable devices worn by user 212. These wearable devices may directly record physical state information 124 and then provide physical state information 124 to collection module 106. Examples of such wearable devices include fitness monitors (e.g., a FITBIT personal monitor), smart watches, smart glasses (e.g., GOOGLE GLASS), wireless headsets, and the like.

In some embodiments, user-state monitoring device 210 may be a purpose-built device designed specifically for assessing the emotional and/or mental state of a user. Additionally or alternatively, user-state monitoring device 210 may be a device designed for another purpose, but nevertheless has capabilities that would allow it to collect physical state information 124. For example, user-state monitoring device may be a so-called Internet-of-Things (IoT) device that is equipped with a microphone and/or camera, such as an AMAZON ECHO or AMAZON ALEXA device. Similarly, user-state monitoring device 210 may be a smart device owned and/or worn by the user, such as a smart watch and/or a smartphone. Such devices may be equipped with various sensors that are able to collect physical state information about the user and then provide that information to collection module 106.

Depending on the device(s) used to collect physical state information 124, collection module 106 may collect a variety of information for use as physical state information 124. In one embodiment, the physical state of the user may include the user's heart rate, respiration rate, brainwave activity, blood pressure, skin conductivity, and/or facial microexpressions. In some examples, collection module 106 may collect information about the physical state of the user by tracking the direction of the user's field of vision. Such vision tracking is sometimes referred to as "gaze tracking," and may be used for a variety of purposes, as will be described in greater detail below, and collection module 106 may receive information from a variety of devices, including but not limited to cameras and/or purpose-built devices.

In some embodiments, collection module 106 may use gaze tracking information as part of determining which files and/or portions of files the user is currently interacting with. For example, a user may have multiple files open and simultaneously displayed on their workstation monitor. In such an example, collection module 106 may determine that the user is looking at a portion of the monitor on which a particular document is displayed, versus a different portion of the monitor that displays a different document. Collection module 106 may then assign physical state information collected while the user was looking at the particular document as representing the user's physical state while the user was interacting with the particular document, even though the different document was also displayed on the monitor at the time.

Returning to FIG. 3 at step 306, one or more of the systems described herein may determine, based on the information about the physical state of the user while the user was interacting with the electronic file, whether the user considers the electronic file to be important. For example, determination module 108 may, as part of server 206 in FIG. 2, determine, based on the physical state information 124 collected while user 212 was interacting with electronic file 208, whether user 212 considers electronic file 208 to be important.

Determination module 108 may perform various types of analysis as part of determining whether user 212 considers electronic file 208 to be important. In general, determination module 108 may use information collected by collection module 106 to evaluate a user's mental and/or emotional state. Mental and/or emotional states that correspond to attentiveness, distress, and/or overall high magnitude of response to a file may indicate whether a user considers a file to be important. For example, a user may exhibit a high level of attentiveness when interacting with a particular file. Determination module 108 may accordingly conclude that the user considers that file to be important.

In some embodiments, determination module 108 may calculate an attention score that represents a numerical approximation of whether user 212 considers electronic file 208 to be important. For example, determination module 108 may assign scores to various elements of physical state information 124 (e.g., voice intonation, facial expressions, gaze tracking, etc.) and combine these scores into an overall attention score. Additionally or alternatively, the attention score may include a percentage probability that the user considers the electronic file to be important. As a specific example, determination module 108 may, based on physical state information 124, calculate that there is a 75% probability that user 212 considers electronic file 208 to be important.

Determination module 108 may also consider how user 212 interacted with electronic file 208. In one embodiment, the attention score may be based on the frequency with which the user views the electronic file and/or the rate at which the user scrolls through the electronic file. A file that is opened multiple times a week may be considered more important than a file that is opened once and then subject to no further interaction. A user that scrolls slower and more deliberately through a text file, perhaps revisiting earlier portions of the file, may consider that file to be more important than a file that the user rapidly scrolls through. Additionally or alternatively, determination module 108 may consider the length of time that the file was left open. For example, a user may run an executable file on their workstation and leave the file running for an extended period of time. Such a file may be more important than a file that a user runs and then closes a short time later. While the aforementioned examples describe text files and executable files, the general principles described herein may be considered applicable to any electronic file, regardless of format or form.

In embodiments that utilize gaze tracking, collection module 106 may collect information about the direction of the user's field of vision. Determination module 108 may then utilize this gaze-tracking information to determine the user's mental and/or emotional state, and/or a level of attention that the user is paying to electronic file 208. For example, determination module 108 may determine that a user's gaze wanders while interacting with electronic file 208, indicating a certain level of distraction. Determination module 108 may then determine, based on the gaze-tracking information, that the user does not consider the file to be particularly important. Given that users are individuals who may exhibit varying gaze patterns that mean attentiveness when exhibited by one user but distraction when exhibited by another user, determination module 108 may maintain user profiles for each user. These user profiles may describe what patterns of gaze tracking information correspond to various mental states and/or levels of attentiveness on the part of that particular user.

Additionally or alternatively, determination module 108 may utilize gaze-tracking information to determine portions of electronic file 208 that the user may consider to be important. For example, determination module 108 may determine that a user spends a higher than average time looking at a certain paragraph within a text document. Determination module 108 may accordingly determine that the user considers that paragraph to be an important portion of electronic file 208. As with other forms of physical state information 124, determination module 108 may utilize gaze-tracking information as part of calculating an overall attention score for the user. Determination module 108 may utilize user profiles as part of analyzing gaze tracking information in these contexts as well.

Moreover, determination module 108 may analyze changes and/or rates of change in the direction of a user's field of view. For example, determination module 108 may determine that user 212 exhibits gaze patterns that indicate disinterest or a lack of engagement with the currently displayed portions of electronic file 212. As a specific example, determination module 108 may determine that user 212 is staring at a single point on a screen, a state that may sometimes be colloquially referred to as "staring blankly" at the screen. Determination module 108 may determine that this state represents a low state of user interest, engagement, and/or interaction with electronic file 208 and accordingly determine that user 212 may consider electronic file 208 and/or that particular portion of electronic file 208 to be unimportant. Similarly, determination module 108 may determine that user 212 exhibits gaze patterns indicating that the user is carefully reading text, scrutinizing an image, or otherwise actively processing part of the displayed portion of electronic file 208. In this latter example, determination module 108 may determine that the user considers electronic file 208 and/or the displayed portions of electronic file 208 to be important.

As described above, the systems and methods described herein may collect and consider physical state information from a group of users. For example, collection module 106 may collect physical state information and calculate an attention score for each user in a group of users that interact with electronic file 208. This group of users may be defined in a variety of ways. For example, a group of users may be defined as employees of an enterprise, members of a department within a greater organization, employees of a certain rank or ranks, etc. As will be described in greater detail below, the systems and methods described herein may then integrate the data collected across one or more of these groups as part of determining the importance of electronic file 208.

In some examples, determination module 108 may determine whether the user considers the electronic file to be important by analyzing the state of the user's electronic workspace while the user was interacting with the electronic file. For example, determination module 108 may consider whether a user was interacting with electronic file 208 while simultaneously interacting with other files designated as important files. Determination module 108 may accordingly determine that electronic file 208 may be an important file based on this workspace association. As a specific example, electronic file 208 may represent a summary of new intellectual property generated by a research group of an enterprise. Determination module 108 may detect that a user is viewing documents related to the intellectual property while writing to electronic file 208 and accordingly determine that the user likely considers electronic file 208 to be an important file based on this association.

Figure 4:
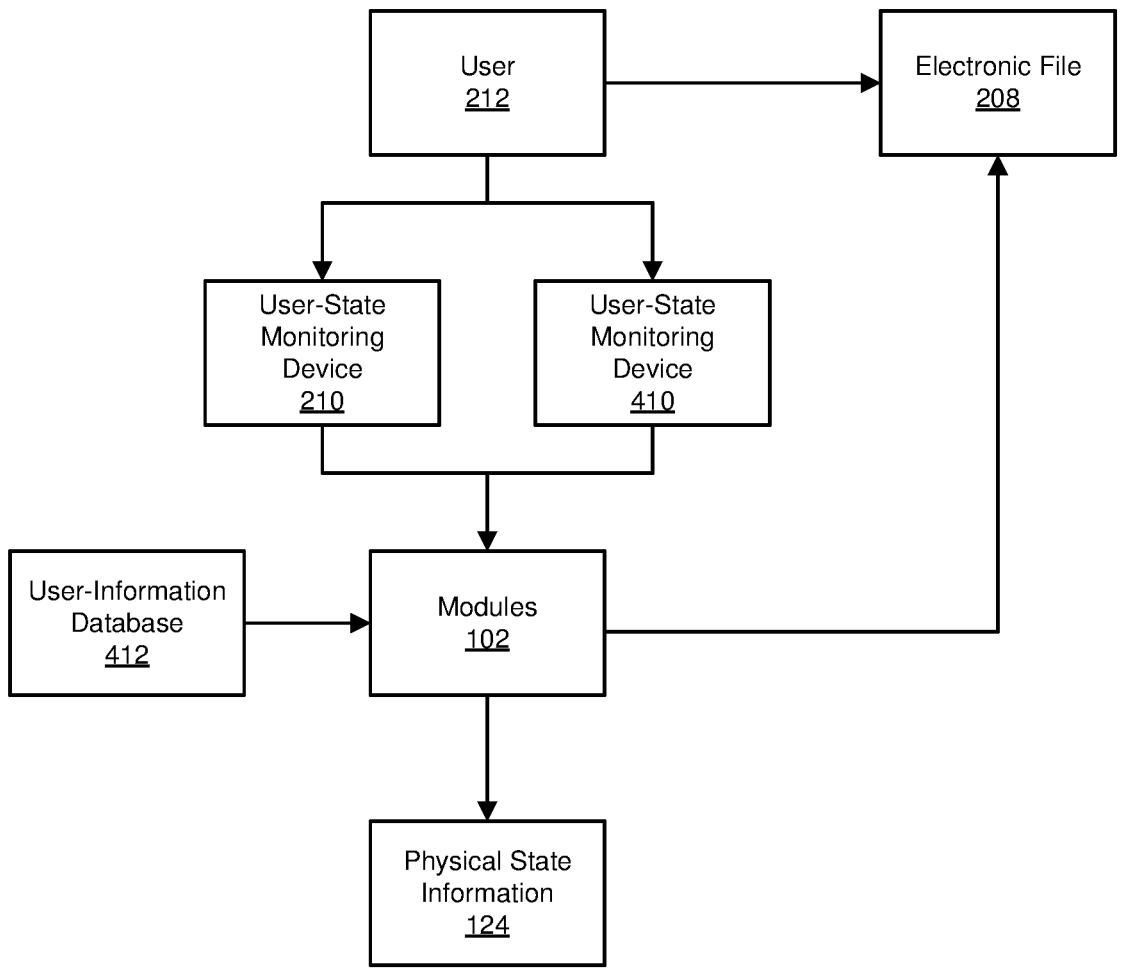
FIG. 4 is a block diagram of an example computing system for determining whether a user considers an electronic file to be important.

An illustrated example of collection module 106 and determination module 108 determining the importance of a file is provided in FIG. 4. As shown in FIG. 4, user 212 may interact with electronic file 208, and user-state monitoring device 210 may capture physical state information about user 212 while they interact with electronic file 208. An additional user-state monitoring device, user-state monitoring device 410, may also capture physical information about user 212 while they interact with electronic file 208. For example, user-state monitoring device 210 may be a webcam attached to the computer and/or workstation (not illustrated) that user 212 is using to interact with electronic file 208, and user-state monitoring device 410 may be a wearable fitness monitor that captures user 212's heart rate.

Collection module 106 may, as part of modules 102 in FIG. 4, collect information from user-state monitoring devices 210 and 410 and store the captured information as physical state information 124. Determination module 108 and/or other elements of modules 102 may additionally retrieve information about user 212 from a user-information database 412. User-information database 412 may include information detailing the user's role and/or rank within an organization, which may be used as part of classifying electronic file 208, as will be described in greater detail below. Determination module 108 may then determine whether user 212 considers electronic file 208 to be important based on physical state information 124 as collected from user-state monitoring devices 210 and 410.

Although the above-described forms of analysis are described separately, determination module 108 may analyze physical state information 124 using a combination of these techniques. For example, physical state information 124 may include both gaze tracking information and snapshots of the user's face that may be used for microexpression analysis.

At step 308 in FIG. 3, one or more of the systems described herein may classify, by the file-categorization system and based at least in part on determining whether the user considers the electronic file to be important, the electronic file as an important file. For example, classification module 110 may, as part of server 206 in FIG. 2, classify, by file-categorization system 122 and based at least in part on determining whether user 212 considers electronic file 208 to be important, electronic file 208 as an important file.

Classification module 110 may classify electronic file 208 as important in a variety of ways. In some embodiments, classification module 110 may modify and/or generate metadata associated with electronic file 208 that designates electronic file 208 as being an important file. For example, classification module 110 may modify file metadata of electronic file 208 to designate electronic file 208 as an important file. Additionally or alternatively, classification module 110 may modify and/or generate a database entry that designates electronic file 208 as an important file. For example, classification module 110 may modify and/or generate an entry representing electronic file 208 in a database of important files.

In some embodiments, classification module 110 may classify electronic file 208 based on attention scores generated by other elements of modules 102, e.g., determination module 108. For example, determination module 108 may generate attention scores for each user that interacts with electronic file 208. In this example, classification module 110 may classify the electronic file as an important file based on an aggregate attention score that represents an approximation of whether the group of users considers the electronic file to be important. Classification module 110 may use any suitable mathematical combination to generate the aggregate attention score. For example, classification module 110 may generate an average score derived across all users that interacted with electronic file 208. Optionally, classification module 110 may use a weighted average, where attention scores associated with certain users (e.g., those more important to the group of users, such as executives and/or managers) are afforded more weight when determining the aggregate attention score. Classification module 110 may then utilize this single aggregate attention score as an approximation of whether the group of users considers electronic file 208 to be important, and classify electronic file 208 accordingly.

Furthermore, classification module 110 may generate aggregate scores for any subdivision of a greater group of users and classify electronic file 208 as important or not important to each sub-group. For example, classification module 110 may classify electronic file 208 based on user roles within a larger organization. Classification module 110 may retrieve this information from an external system (illustrated as user-information database 412 in FIG. 4), such as a MICROSOFT ACTIVE DIRECTORY, a MICROSOFT OUTLOOK database of users, and the like. Depending on the positions and/or roles of these users, classification module 110 may classify electronic file 208 as important to an individual user, an organization, a department within the organization, and/or any other suitable logical grouping of users. As described above in connection with determination module 108, users that interact with electronic file 208 may occupy various roles within an organization. Determination module 108 may determine that electronic file 208 is important to one or more of these groups, and classification module 110 may accordingly generate metadata and/or database entries indicating as such. For example, users that are known to be members of a particular research department may interact with electronic file 208. Determination module 108 may determine that these users consider electronic file 208 to be important, and cause classification module 110 to classify electronic file 208 to be important to that research department based on the users being members of the research department.

Figure 5:
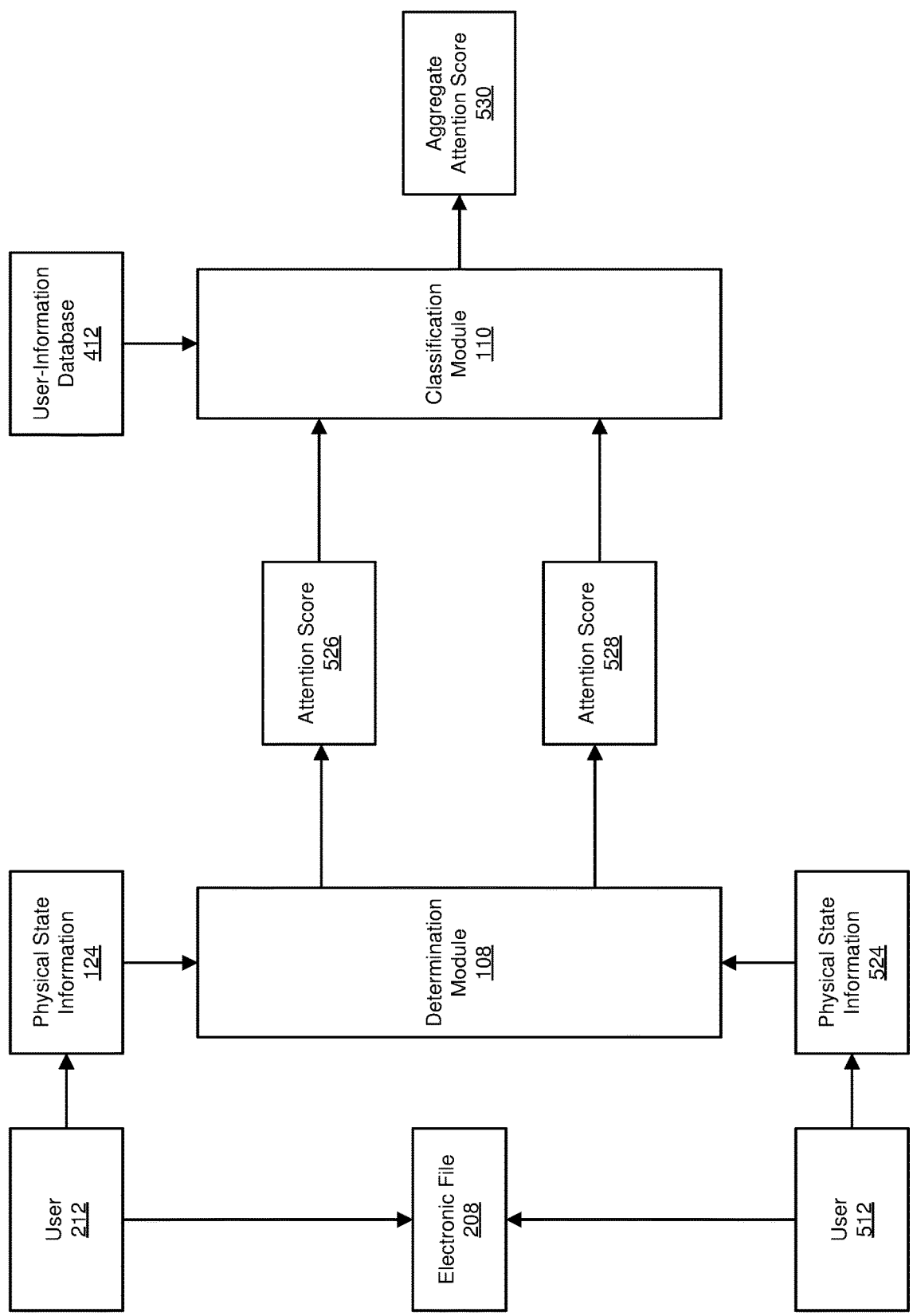
FIG. 5 is a block diagram of an example computing system for classifying electronic files.

An illustrated example of generating an aggregate attention score is provided in FIG. 5. As shown in FIG. 5, users 212 and 512 may each interact with instances of electronic file 208. Various elements of modules 102 (not illustrated) may identify that electronic file 208 is being evaluated for importance, and record physical state information 124 and 524 about users 212 and 512, respectively, as they interact with electronic file 208. Furthermore, elements of modules 102 may determine that users 212 and 512 are members of a particular group, such as a department within an organization. Determination module 108 may, based on physical state information 124 and 524, calculate individual attention scores for users 212 and 512. In the example of FIG. 5, determination module 108 may generate attention score 526, representing an approximation of how likely user 212 is to consider electronic file 208 to be an important file. Similarly, determination module 108 may generate attention score 528 for user 512. Classification module 110 may receive attention scores 526 and 528 as an input. As described above, classification module 110 may weight individual attention scores based on a role and/or position held by the corresponding user. In this example, classification module 110 may use information from user-information database 412 (described in greater detail in connection with FIG. 4) to determine how to weight attention score 526 and attention score 528 when computing an aggregate attention score 530 that represents an approximation of whether the group composed of users 212 and 512 consider electronic file 208 to be important. Classification module 110 may then classify electronic file 208 based on aggregate attention score 530 and/or information retrieved from user-information database 412.

In some embodiments, classification module 110 and/or other elements of modules 102 may identify a group of users and classify electronic file 208 based on an enterprise workflow. Such information may be stored in a database (e.g., user-information database 412 in FIG. 4). For example, classification module 110 may determine that electronic file 208 is part of a particular enterprise workflow. As described above, classification module 110 may classify electronic file 208 based on a group of users. In this example, classification module 110 may define the group based on users involved in the enterprise workflow. Classifying module 110 may classify electronic file 208 based at least in part on determining whether each user identified in the enterprise workflow considers the electronic file to be important.

Moreover, classification module 110 may assign more than one classification to electronic file 208. For example, classification module 110 may classify electronic file 208 as important to some users but not to others. As a specific example, determination module 108 may determine that electronic file 208 is important to a particular user as well as a department within an organization, but is unlikely to be important to the organization as a whole. Classification module 110 may accordingly classify electronic file 208 as important to the user and the department through metadata, database entries, etc. as described above.

Optionally, classification module 110 may assign an importance score to electronic file 208 that represents an approximation of how important electronic file 208 is in general. This importance score may be a percentage representing a percentage likelihood that electronic file 208 is actually important, a priority ranking, a linear combination of factors used in determining whether electronic file 208 is important, or any other suitable numeric representation of how important electronic file 208 is to those users and/or groups that consider electronic file 208 to be important. For example, classification module 110 may classify electronic file 208 as important to an organization, with an importance score of 75%, indicating that there is a 75% chance that electronic file 208 is actually important to the organization. As an additional example, classification module 110 may classify electronic file 208 as important to a department within an organization, with a priority score of 100. In this example, the priority score of 100 may indicate that the file should be treated with increased scrutiny/urgency/priority than files with lower priority scores. Of course, various implementations of this concept may alternatively define a lower priority score as more important (i.e., where a score of 1 is more important than a score of 50).

Additionally or alternatively, classification module 110 may classify electronic file 208 in the context of classifications assigned by other systems. For example, classification module 110 may refrain from categorizing certain categories of files, such as leisure materials, as important. As a specific example, a manager at an organization may read digital comic books in her free time, and an external categorization system may classify the digital comic books as "leisure materials." Classification module 110 may retrieve, receive, and/or otherwise identify that the digital comic books have been classified as leisure materials, and refrain from identifying them as important even if the manager exhibits significant interest in the material.

In some embodiments, one or more of the modules described herein may notify various software security systems that electronic file 208 has been designated as an important file and/or provide those systems with information regarding electronic file 208. Examples of such external systems include, without limitation, data-loss prevention (DLP) systems, file backup systems, and/or file-integrity management systems. For example, classification module 110 may provide such a software security system with access to a database of known important files. Additionally or alternatively, these software security systems may read file metadata associated with electronic file 208 and modify their behavior according to whether or not electronic file 208 has been designated as an important file. For example, a DLP system may treat transfers and copying of important files with an increased level of scrutiny in order to minimize the risk of leaking or losing sensitive information while simultaneously treating unimportant or less important files with lesser levels of scrutiny to save on processing resources. File backup systems may prioritize backing up important files for similar reasons, and file-integrity management systems may treat important files with increased scrutiny and/or dedicate additional resources to managing those files over files that are considered less important.

As explained above in connection with FIG. 3 and method 300, a file-classification system may flag one or more files for assessment. An identification module may identify these files as well as copies and/or other instances of these files that may reside on various computing systems throughout and enterprise network, and identify users who interact with the flagged files. A collection module may utilize a variety of devices to collect information about those users' emotional, psychological, and/or physical states while those users are interacting with flagged files. Based on those users' states while interacting with the files, a determination module may determine whether the users consider a flagged file to be important or not. A classification module may, based on these determinations, classify flagged files as important, and may further classify the files as important to specific groups, or even the enterprise as a whole. Optionally, the classification module may utilize a more in-depth classification, such as assigning percentage confidence scores representing a likelihood that a file is important, assigning priority scores to denote relative importance of different files, etc. The classification module may then propagate this classification to all copies and/or instances of the file. Finally, the classification module may provide the classification information to and/or notify other software security systems, thereby enabling those security systems to efficiently protect and/or preserve critical files while simultaneously being able to conserve system resources.

Figure 6:
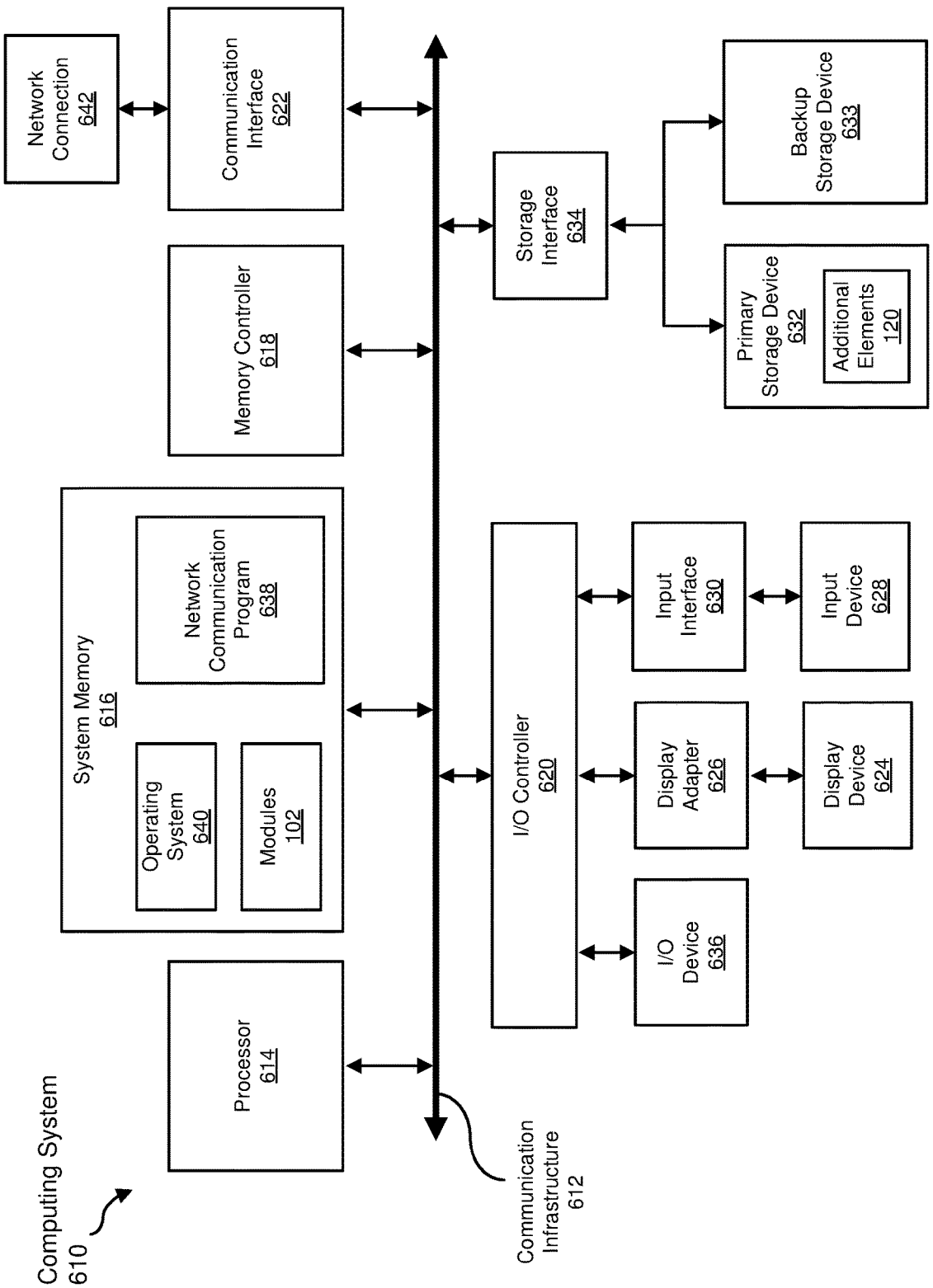
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, some or all of additional elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
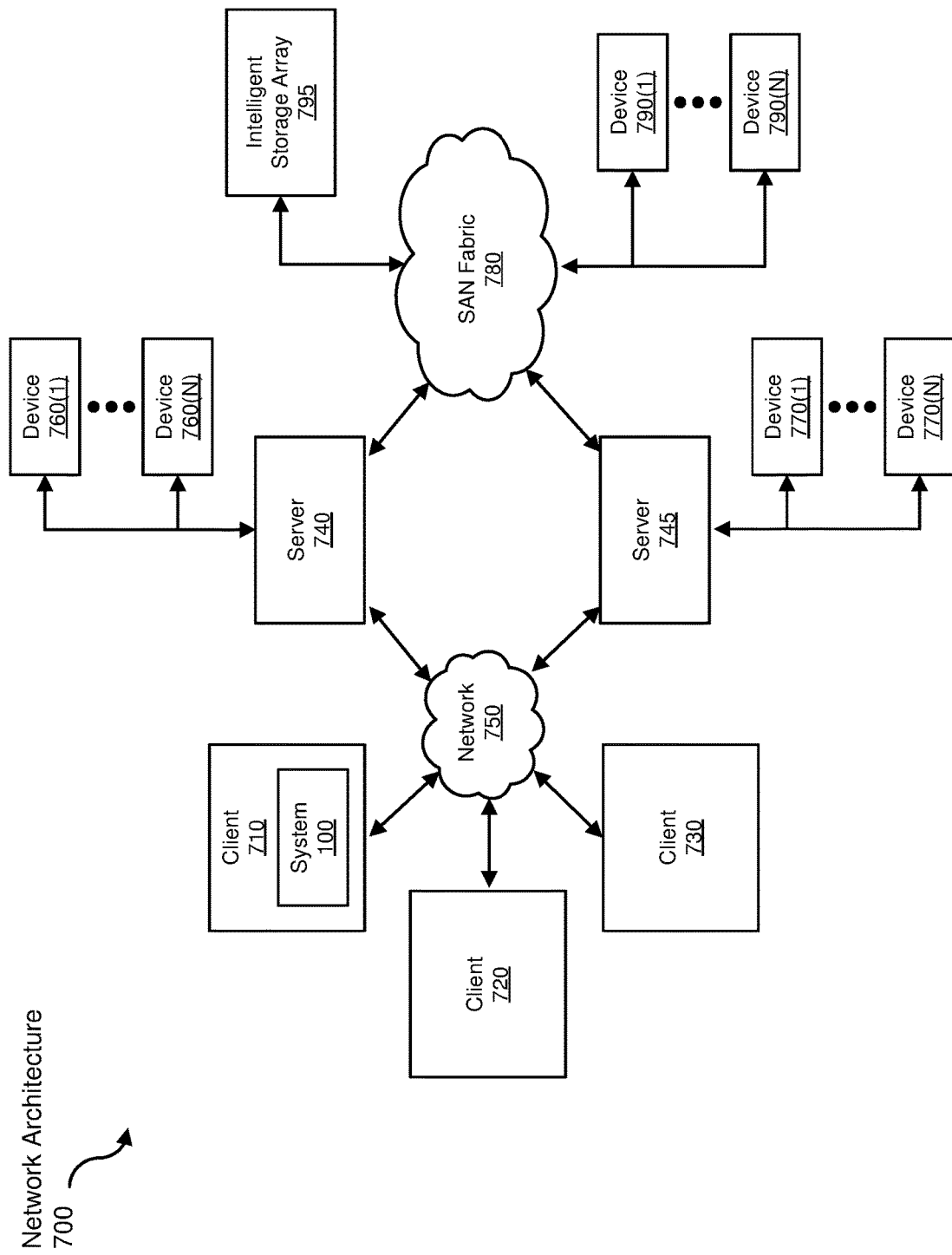
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for classifying electronic files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or of the modules recited herein may receive physical state information to be transformed, transform the physical state information into an attention score, use the attention score to determine whether the user considers an electronic file to be important, use a result of the determination to classify the file as an important file, output a result of the classification to a database and/or storage device, and/or provide a result of the classification to a software security system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for classifying electronic files, at least a portion of the method being performed by a computing device comprising at least one processor, the method comprising:
    identifying a plurality of instances of an electronic file that comprises a plurality of versions of the electronic file;
    in response to determining that a user from among a plurality of users is interacting with one or more instances of an electronic file by opening the one or more instances of the electronic file on a computing device, causing a file-categorization system to evaluate the one or more instances of the electronic file for importance;
    collecting, via at least one user-state monitoring device, information about a physical state of at least one user while the user is interacting with the one or more instances of the electronic file;
    determining, based on the information about the physical state of the user while the user was interacting with the one or more instances of the electronic file, whether the user considers the one or more instances of the electronic file to be important;
    classifying, by the file-categorization system and based at least in part on determining whether each user in the plurality of users that has interacted with the one or more instances of the electronic file considers the one or more instances of the electronic file to be important, the plurality of instances of the electronic file as important files; and
    in response to classifying the plurality of instances of the electronic file as important files, notifying at least one software security system that the plurality of instances of the electronic file are important files, thereby causing the at least one software security system to prioritize actions involving the important files over actions involving electronic files that are not classified as important files.

2. The method of claim 1, wherein determining whether the user considers the one or more instances of the electronic file to be important comprises calculating, based on the information about the physical state of the user, an attention score that represents a numerical approximation of whether the user considers the one or more instances of the electronic file to be important.

3. The method of claim 2, wherein the attention score comprises a percentage probability that the user considers the one or more instances of the electronic file to be important.

4. The method of claim 2, wherein the attention score is based on at least one of:
    the frequency with which the user views the one or more instances of the electronic file; and
    the rate at which the user scrolls through the one or more instances of the electronic file.

5. The method of claim 2:
    further comprising calculating an attention score for each user in a plurality of users that interact with one or more instances of the electronic file; and
    wherein classifying the plurality of instances of the electronic file as important files comprises classifying the plurality of instances of the electronic file based on an aggregate attention score that represents an approximation of whether the plurality of users considers the plurality of instances of the electronic file to be important.

6. The method of claim 1, wherein the physical state of the user comprises at least one of the user's:
    heart rate;
    respiration rate;
    brainwave activity; and
    facial microexpressions.

7. The method of claim 1, wherein collecting information about the physical state of the user comprises tracking the direction of the user's field of vision.

8. The method of claim 7, further comprising identifying, based on analyzing the direction of the user's field of vision, an important section of the one or more instances of the electronic file.

9. The method of claim 1, wherein classifying the plurality of instances of the electronic file as important files comprises classifying the plurality of instances of the electronic file based on a role within an organization that is associated with the user.

10. The method of claim 9, wherein classifying the plurality of instances of the electronic file based on the role within the organization comprises classifying the plurality of instances of the electronic file as important to at least one of:
    the user;
    an organization; and
    a department within the organization.

11. The method of claim 1, wherein determining whether the user considers the one or more instances of the electronic file to be important comprises analyzing the state of the user's electronic workspace while the user was interacting with the one or more instances of the electronic file.

12. The method of claim 1:
    further comprising:
        determining that the plurality of instances of the electronic file is part of an enterprise workflow; and
        identifying a plurality of users involved in the enterprise workflow; and
    wherein classifying the plurality of electronic files comprises classifying the plurality of instances of the electronic file as important files based at least in part on determining whether each user in the plurality of users considers at least one instance in the plurality of instances of the electronic file to be important.

13. The method of claim 1, wherein collecting the information about the physical state of the user comprises collecting information from at least one wearable device worn by the user.

14. The method of claim 1, wherein the software security system comprises at least one of:
 a data-loss prevention system;
 a file backup system; and
 a file-integrity management system.

15. A system for classifying electronic files, the system comprising:
 an identification module, stored in a memory of the system, that:
  identifies a plurality of instances of an electronic file comprising a plurality of versions of the electronic file; and
  in response to determining that a user from among a plurality of users is interacting with one or more instances of an electronic file by opening the one or more instances of the electronic file on a computing device, causes a file-categorization system to evaluate the one or more instances of the electronic file for importance;
 a collection module, stored in the memory, that collects, via at least one user-state monitoring device, information about a physical state of at least one user while the user is interacting with the one or more instances of the electronic file;
 a determination module, stored in the memory, that determines, based on the information about the physical state of the user while the user was interacting with the one or more instances of the electronic file, whether the user considers the one or more instances of the electronic file to be important;
 a classification module, stored in the memory, that:
  classifies, by the file-categorization system and based at least in part on determining whether each user in the plurality of users that has interacted with the one or more instances of the electronic file considers the one or more instances of the electronic file to be important, the plurality of instances of the electronic file as important files; and
  in response to classifying the plurality of instances of the electronic file as important files, notifies at least one software security system that the plurality of instances of the electronic file are important files, thereby causing the at least one software security system to prioritize actions involving the important files over actions involving electronic files that are not classified as important files; and
 at least one physical processor configured to execute the identification module, the collection module, the determination module, and the classification module.

16. The system of claim 15, wherein the determination module determines whether the user considers the one or more instances of the electronic file to be important comprises calculating, based on the information about the physical state of the user, an attention score that represents a numerical approximation of whether the user considers the one or more instances of the electronic file to be important.

17. The system of claim 16, wherein the attention score comprises a percentage probability that the user considers the one or more instances of the electronic file to be important.

18. The system of claim 16, wherein the attention score is based on at least one of:
 the frequency with which the user views the one or more instances of the electronic file; and
 the rate at which the user scrolls through the one or more instances of the electronic file.

19. The system of claim 16, wherein:
 the determination module calculates an attention score for each user in a plurality of users that interact with at least one instance of the electronic file; and
 the classification module classifies the plurality of instances of the electronic file as important files by classifying the plurality of instances of the electronic file based on an aggregate attention score that represents an approximation of whether the plurality of users considers the plurality of instances of the electronic file to be important.

20. A non-transitory computer-readable medium comprising one or more computer-readable instructions that, when executed by at least one processor of a computing device, cause the computing device to:
 identify a plurality of instances of an electronic file that comprises a plurality of versions of the electronic file;
 in response to determining that a user from among a plurality of users is interacting with one or more instances of an electronic file by opening the one or more instances of the electronic file on a computing device, cause a file-categorization system to evaluate the one or more instances of the electronic file for importance;
 collect, via at least one user-state monitoring device, information about a physical state of at least one user while the user is interacting with the one or more instances of the electronic file;
 determine, based on the information about the physical state of the user while the user was interacting with the one or more instances of the electronic file, whether the user considers the one or more instances of the electronic file to be important;
 classify, by the file-categorization system and based at least in part on determining whether each user in the plurality of users that has interacted with the one or more instances of the electronic file considers the one or more instances of the electronic file to be important, the plurality of instances of the electronic file as important files; and
 in response to classifying the plurality of instances of the electronic file as important files, notify at least one software security system that the plurality of instances of the electronic file are important files, thereby causing the at least one software security system to prioritize actions involving the important files over actions involving electronic files that are not classified as important files.

* * * * *